(12) United States Patent
Yoon et al.

(10) Patent No.: US 8,666,463 B2
(45) Date of Patent: Mar. 4, 2014

(54) PORTABLE COMMUNICATION APPARATUS WITH AUTOMATICALLY ROTATING DISPLAY BY ACTUATING A SWITCH UNIT

(75) Inventors: Yoo-Seok Yoon, Seoul (KR); Soo-Ik Jung, Seoul (KR)

(73) Assignee: Samsung Electronics Co., Ltd., Suwon-si (KE)

( * ) Notice: Subject to any disclaimer, the term of this patent is extended or adjusted under 35 U.S.C. 154(b) by 841 days.

(21) Appl. No.: 11/529,497

(22) Filed: Sep. 29, 2006

(65) Prior Publication Data

US 2007/0082695 A1  Apr. 12, 2007

(30) Foreign Application Priority Data

Oct. 7, 2005 (KR) .......................... 10-2005-0094358

(51) Int. Cl.
*H04M 1/00* (2006.01)

(52) U.S. Cl.
USPC ..................... 455/575.4; 455/575.3; 340/487; D14/138 AD

(58) Field of Classification Search
USPC ............................... 455/550.1, 575.1–575.4; 361/679.01–679.61; 340/487–490, 484
See application file for complete search history.

(56) References Cited

U.S. PATENT DOCUMENTS

| | | | | |
|---|---|---|---|---|
| 7,107,084 | B2 * | 9/2006 | Duarte et al. | 455/575.3 |
| 7,224,373 | B1 * | 5/2007 | Duarte et al. | 345/659 |
| 7,412,258 | B1 * | 8/2008 | Lipponen et al. | 455/556.1 |
| 7,636,748 | B2 * | 12/2009 | Duarte et al. | 709/201 |
| 2002/0016191 | A1 * | 2/2002 | Ijas et al. | 455/575 |
| 2003/0109230 | A1 | 6/2003 | Duarte et al. | |
| 2005/0009572 | A1 * | 1/2005 | Ahn et al. | 455/566 |
| 2005/0064921 | A1 * | 3/2005 | Jeong et al. | 455/575.4 |
| 2005/0130720 | A1 * | 6/2005 | Finke-Anlauff | 455/575.3 |
| 2005/0219372 | A1 | 10/2005 | Watanabe | |
| 2006/0073859 | A1 * | 4/2006 | Chou | 455/575.4 |

FOREIGN PATENT DOCUMENTS

| | | |
|---|---|---|
| CN | 200410069811 | 2/2005 |
| EP | 1 496 675 | 1/2005 |
| EP | 1 585 316 | 10/2005 |
| KR | 20-0180373 | 5/2000 |
| KR | 2004-0096167 | 11/2004 |
| TW | 263698 | 5/2005 |

* cited by examiner

*Primary Examiner* — Vladimir Magloire
(74) *Attorney, Agent, or Firm* — Roylance, Abrams, Berdo & Goodman, L.L.P.

(57) ABSTRACT

A portable communication apparatus in which an LCD can slide and stand at a desired angle is provided. To this end, the portable communication apparatus includes a first housing extending in a longitudinal direction and a second housing that slides substantially perpendicularly to the longitudinal direction and rotates while facing the first housing to stand at a desired angle. A guide member guides the sliding and rotational movement of the second housing, and a rotational moving member is included between the first housing and the second housing to make the second housing stand at the desired angle.

14 Claims, 8 Drawing Sheets

PORTABLE COMMUNICATION APPARATUS WITH AUTOMATICALLY ROTATING DISPLAY BY ACTUATING A SWITCH UNIT

CROSS-REFERENCE TO RELATED APPLICATION

This application claims the benefit under 35 U.S.C. §119 (a) of Korean Patent Application No. 2005-94358, filed on Oct. 7, 2005, in the Korean Intellectual Property Office, the entire contents of which are hereby incorporated by reference.

BACKGROUND OF THE INVENTION

1. Field of the Invention

The present invention generally relates to a portable communication apparatus. More particularly, the present invention relates to a portable communication apparatus with a Liquid Crystal Device (LCD) that can slide and stand at a desired angle.

2. Description of the Related Art

In general, a "portable apparatus" is an apparatus which a user can carry with him/her to perform wireless communication with a partner. Examples of portable apparatuses include HHPs (hand held phones), CT-2 cellular phones, digital phones, PCS (personal communication service) phones, and PDAs (personal digital assistants). Conventional wireless terminals may be classified into various types according to their appearance. For example, wireless terminals may be classified into bar-type wireless terminals, flip-type wireless terminals, and folder-type wireless terminals according to their appearance. A bar-type wireless terminal has a single housing shaped like a bar. A flip-type wireless terminal has a flip which is pivotally mounted to a bar-shaped housing by a hinge unit. A folder-type wireless terminal has a folder coupled to a single bar-shaped housing by a hinge unit in such a manner that the folder can be rotated to be folded to or unfolded from the housing.

There is also a camera phone equipped with a camera lens module which enables a user to perform image communication with a partner or take a picture of a desired subject.

With the rapid spread of portable terminals, the use of portable terminals has become commonplace. This has led to a tendency toward developing complex portable terminals that have not only simple calling functions, but also various functions to meet users' demands. For example, various additional services like on-demand video viewing, image communication, digital camera functions, Internet services, and TV viewing (as well as voice communication) are provided through the portable terminals.

The TV viewing function in a portable terminal is referred to as Digital Multimedia Broadcasting (DMB). A DMB capable portable terminal provides a user with a TV broadcasting program viewing function using a display device as well as functions of a conventional mobile communication apparatus.

Users feel uncomfortable in watching TV using a portable terminal for a long time because of the need to hold the portable terminal with a hand. Moreover, when the users attempt to stand the portable terminal on the ground, the main body of the portable terminal cannot stand erect.

To address this problem, a support device has been used. However, the support device should be carried with the portable terminal, causing another inconvenience.

Furthermore, since the support device for the conventional portable terminal must basically include at least three leg portions and fixing portions, the volume and weight of the support device are large. Also, the support device must be carried even after the device is no longer being used.

Accordingly, there is a need for an improved portable communication device which may be used for convenient television viewing.

SUMMARY OF THE INVENTION

An aspect of the present invention is to address at least the above problems and/or disadvantages and to provide at least the advantages described below. Accordingly, an aspect of the present invention is to provide a portable communication apparatus in which an LCD can slide and stand at a desired angle, thereby allowing a user to easily watch TV and moving pictures.

According to an aspect of the present invention, there is provided a portable communication apparatus including a first housing extending in a longitudinal direction, a second housing that slides substantially perpendicularly to the longitudinal direction and rotates while facing the first housing to stand at a desired angle, a guide means that guides the sliding movement of the second housing, and a rotational moving means disposed between the first housing and the second housing to make the second housing stand at the desired angle.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same reference numerals will be understood to refer to the same elements, features, and structures.

DETAILED DESCRIPTION OF EXEMPLARY EMBODIMENT

The matters defined in the description such as a detailed construction and elements are provided to assist in a comprehensive understanding of the exemplary embodiments of the invention and are merely exemplary. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

An exemplary embodiment of the present invention will now be described in detail with reference to the annexed drawings.

Figure 1:
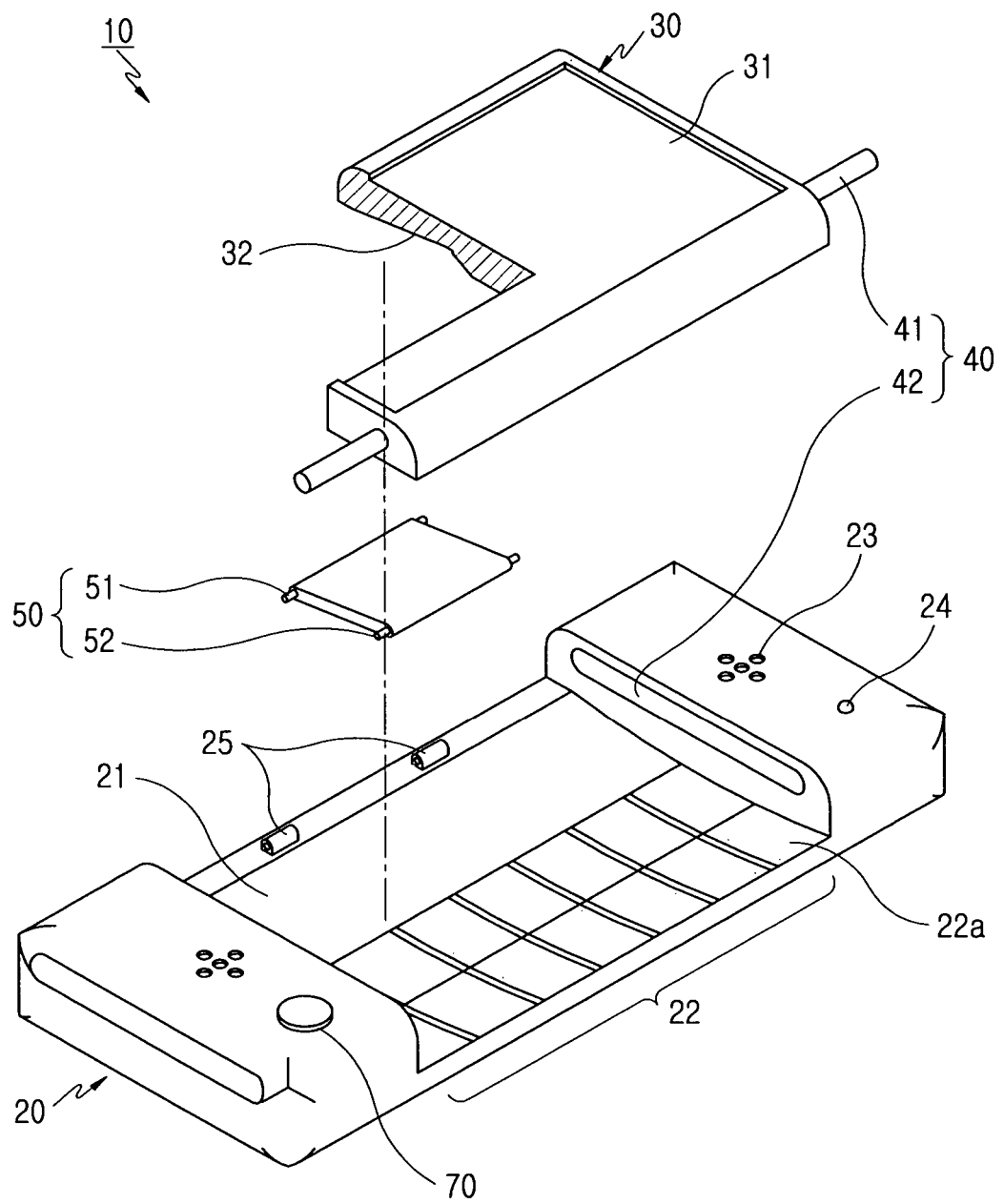
FIG. 1 is a partially-cut away exploded view showing a portable communication apparatus according to an exemplary embodiment of the present invention.
Figure 2:
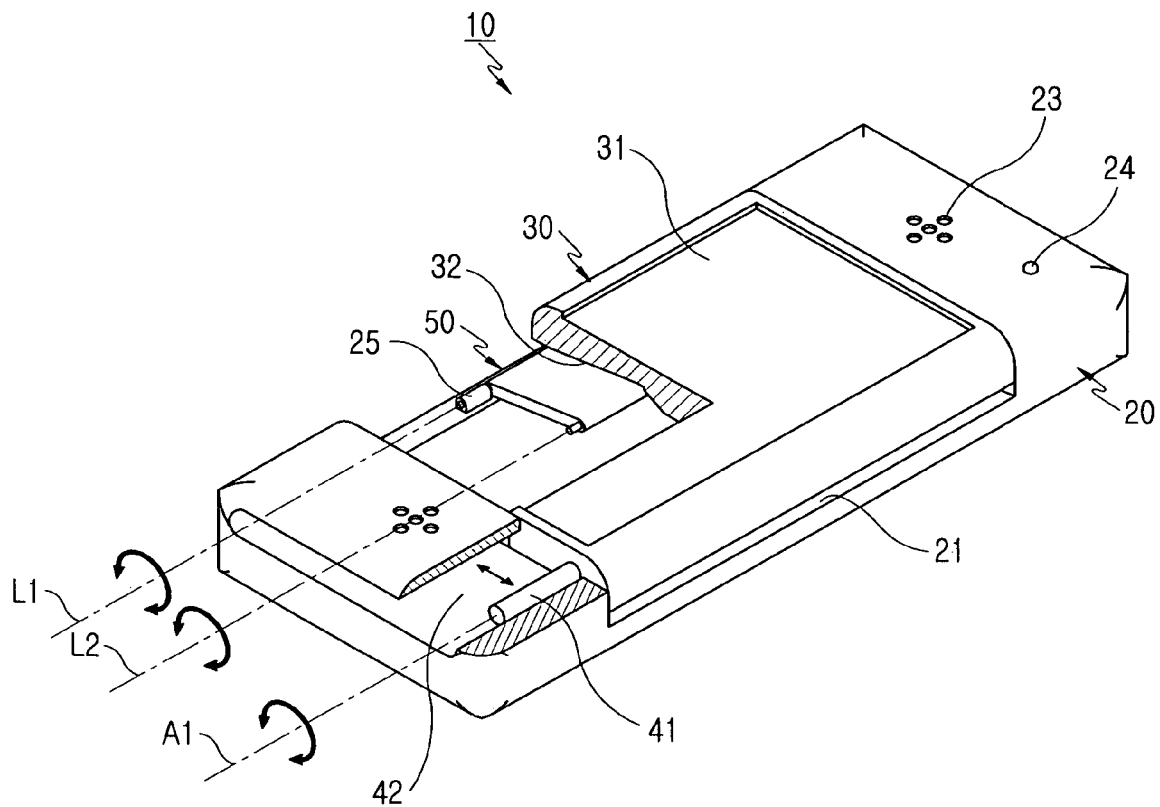
FIG. 2 is a partially-cut away perspective view showing a portable communication apparatus according to an exemplary embodiment of the present invention.

As shown in FIGS. 1 and 2, a portable communication apparatus 10 includes a first housing 20, a second housing 30, a guide means 40, and a rotational moving means 50. The first housing 20 extends in a longitudinal direction to face the second housing 30 and the second housing 30 is positioned on the first housing 20 such that it slides substantially perpendicularly to the longitudinal direction and rotates to stand at a desired angle. The guide means 40 is included in both ends of the first housing 20 to guide the sliding movement of the second housing 30. The rotational moving means 50 is included between the first housing 20 and the second housing 30 to rotate in such a way to make the second housing 30 stand at a desired angle.

Figure 4:
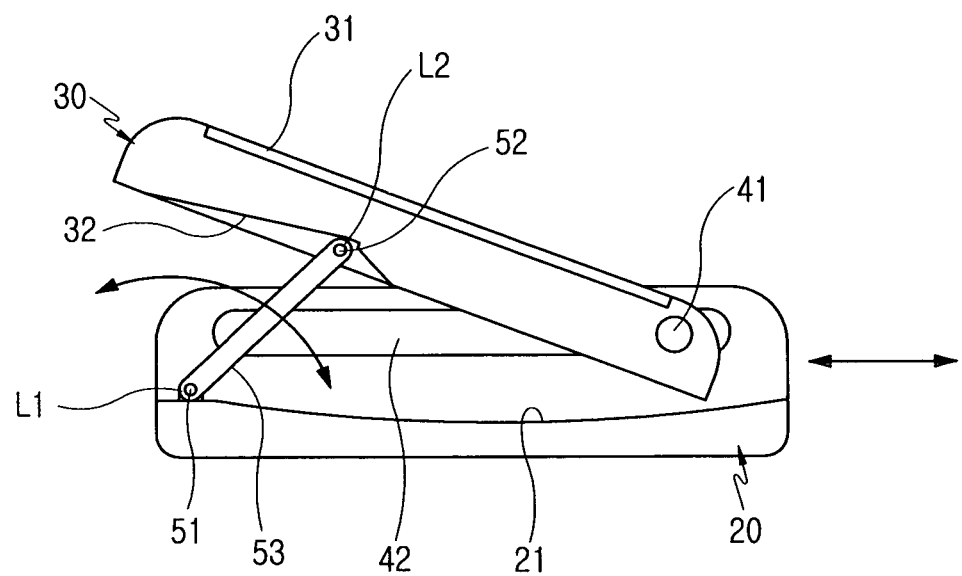
FIG. 4 is a side sectional view showing the operation of a second housing of a portable communication apparatus according to an exemplary embodiment of the present invention.

As shown in FIGS. 1 and 4, a mounting face 21 recessed to a predetermined depth is formed on the first housing 20 to allow the second housing to be mounted thereon and allow the second housing 30 to slide and rotate with respect to the first housing 20. The mounting face 21 has a curved surface to facilitate sliding and rotation of the second housing 30.

Figure 7:
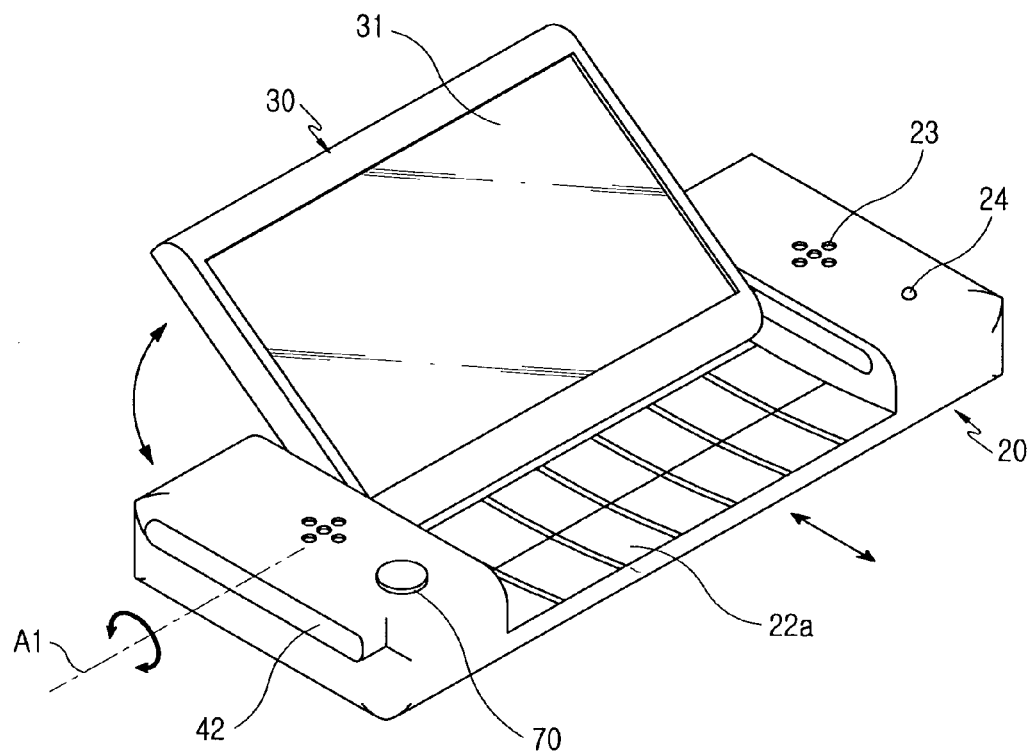
FIG. 7 is a perspective view showing a second housing of a portable communication apparatus according to an exemplary embodiment of the present invention, after it has been operated.

As shown in FIGS. 1 and 7, the first housing 20 includes a keypad 22 including a plurality of keys 22a. The keypad 22 is opened or closed by sliding the second housing 30. The second housing 30 includes a Liquid Crystal Display (LCD) 31 to facilitate watching TV and moving pictures.

As shown in FIGS. 1, 2, 4, 6, and 8, the guide means 40 includes a pair of guide members 41 and guide holes 42. The guide members 41 are formed at both ends of the second housing 30 to be slidably combined with the guide holes 42. The guide holes 42 are substantially perpendicular to the longitudinal direction of the first housing 20 so that the guide members 41 may slide within the guide holes 42 and rotate with respect to a rotation axis A1.

Figure 5:
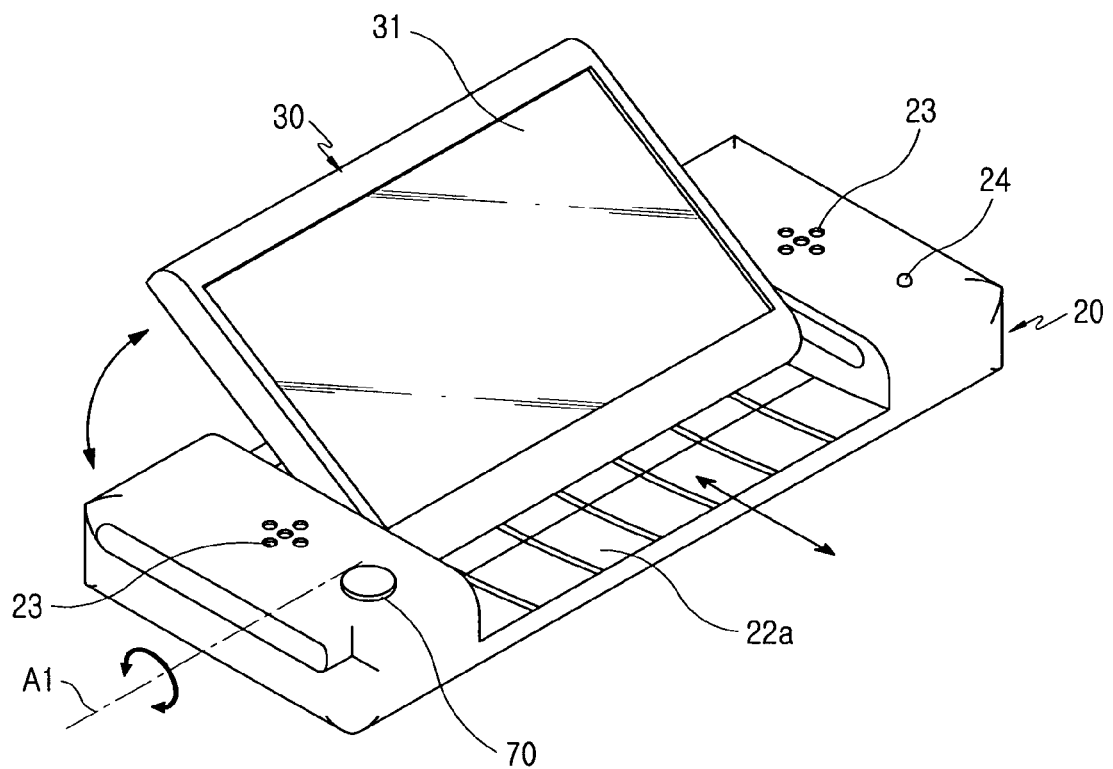
FIG. 5 is a perspective view showing the sliding and rotation of a second housing of a portable communication apparatus according to an exemplary embodiment of the present invention.

As shown in FIG. 5, the first housing 20 includes speaker devices 23 and a microphone device 24.

Figure 6:
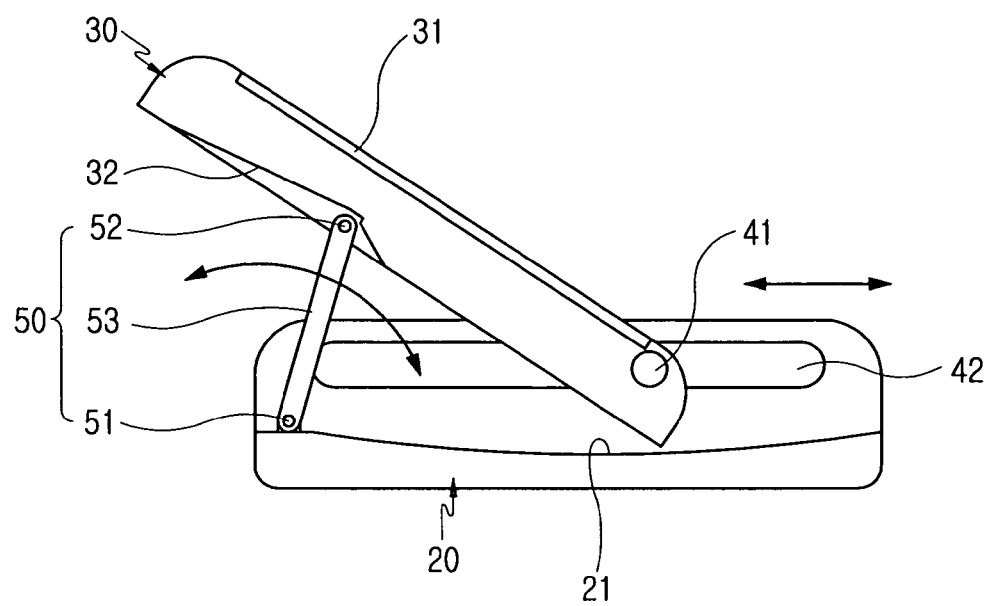
FIG. 6 is a side sectional view showing the sliding and rotation of a second housing of a portable communication apparatus according to an exemplary embodiment of the present invention.
Figure 8:
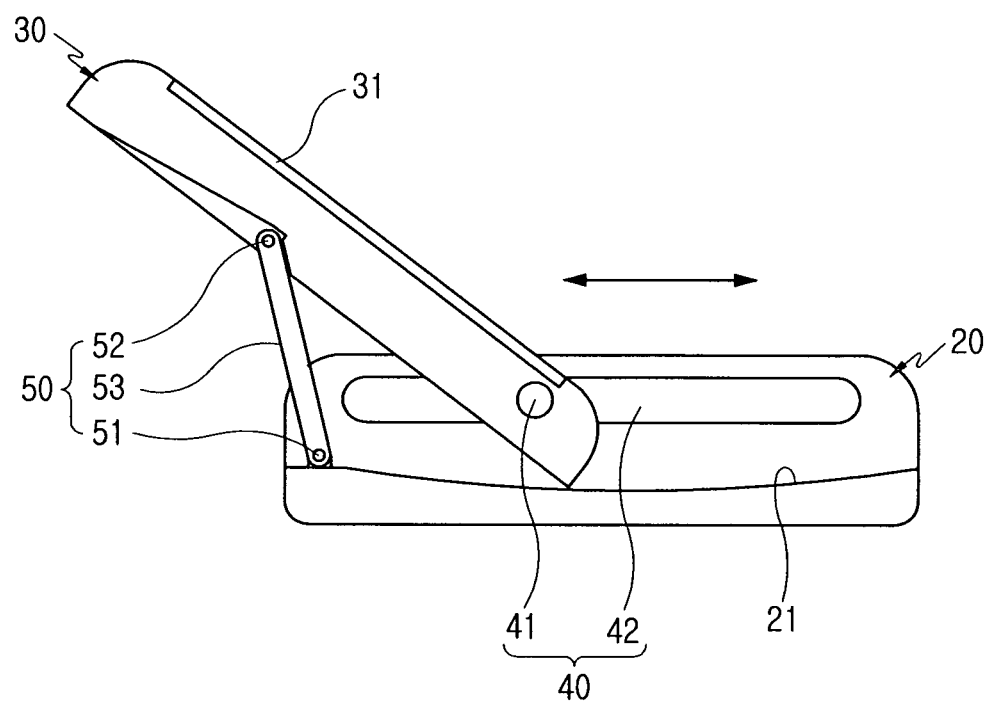
FIG. 8 is a side sectional view showing a second housing of a portable communication apparatus according to an exemplary embodiment of the present invention, after it has been operated.

As shown in FIGS. 4, 6, and 8, the rotational moving means 50 includes a link member 53 to allow the second housing 30 to be folded or rotated so that the second housing 30 is angled with respect to a first link rotation axis L1 and a second link rotation axis L2 during sliding of the second housing 30. A first end 51 of the link member 53 provides the first link rotation axis L1 and can be rotatably combined with a pair of link arms 25 formed in the first housing 20. A second end 52 of the link member 53 provides the second link rotation axis L2 and can be rotatably combined with the back side of the second housing 30. A resting groove 32 is formed in the back side of the second housing 30 to rest the link member 53 thereon according to the sliding and rotation of the second housing 30.

The operation of the portable communication apparatus 10 according to an exemplary embodiment of the present invention will be described in more detail with reference to FIGS. 1 through 8.

As shown in FIGS. 1 and 2, the portable communication apparatus 10 includes the first housing 20 extending in a longitudinal direction, the second housing 30, the guide means 40, and the rotational moving means 50.

The mounting face 21 is formed on the first housing 20 to allow the second housing 30 to face the first housing 20, and the second housing 30 is mounted on the mounting face 21 of the first housing 20 in opposition to the first housing 20.

The pair of guide members 41 formed in the second housing 30 are slidably and rotatably combined with the guide holes 42 formed in the first housing 20.

In this state, as shown in FIG. 2, the rotational moving means 50 is located between the first housing 20 and the second housing 30.

The rotational moving means 50 includes the link member 53. The link member 53 rests on the resting groove 32 formed in the back side of the second housing 30.

The first end 51 of the link member 53 is rotatably combined with the pair of link arms 25 formed in the first housing 20 and the second end 52 of the link member 53 is rotatably combined with the back side of the second housing 30.

Figure 3:
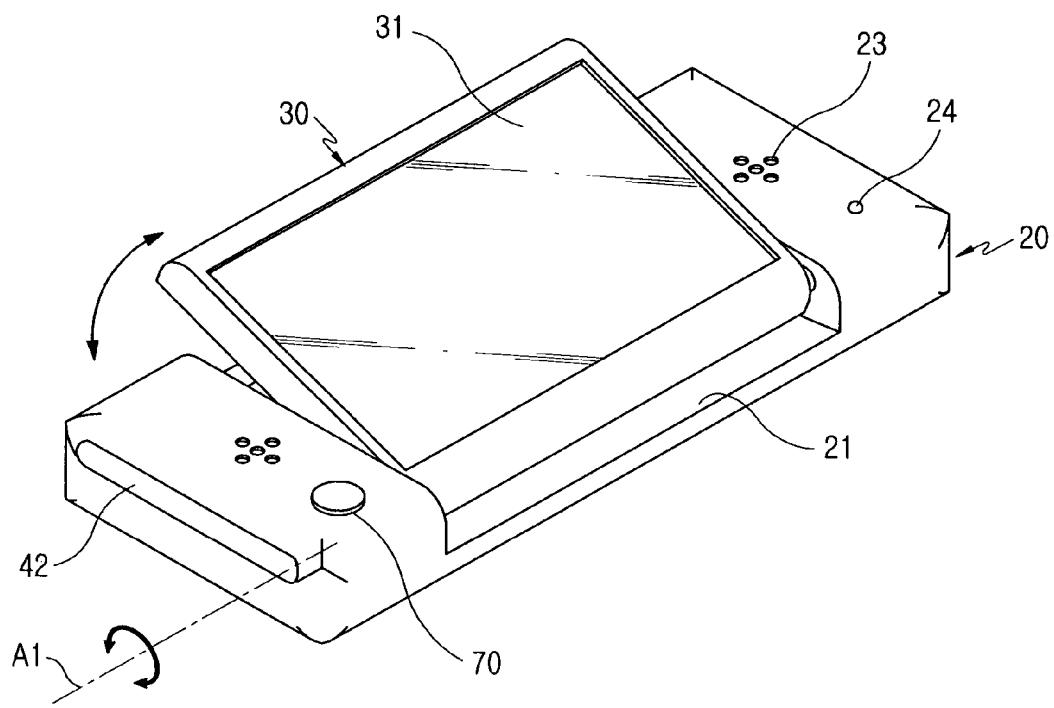
FIG. 3 is a perspective view showing the operation of a second housing of a portable communication apparatus according to an exemplary embodiment of the present invention.

In this state, as shown in FIGS. 3, 5, and 7, when watching TV and moving pictures using the portable communication apparatus 10, a user pushes the second housing 30 substantially perpendicularly to the longitudinal direction of the first housing 20 to slide the second housing 30.

As shown in FIGS. 4 and 6, the guide member 41 of the second housing 30 moves within the guide hole 42 of the first housing 20.

As shown in FIGS. 5 and 7, the second housing 30 slides along the curve of the mounting face 21 and the second housing 30 is supported at a desired angle with respect to the first housing 20 by the link member 53. When the guide member 41 of the second housing 30 slides, it also rotates with respect to the rotation axis A1 of the guide hole 42.

In this state, as shown in FIGS. 4 and 6, if the second housing 30 further slides, the link member 53 rotates with respect to the first link rotation axis L1 and the second link rotation axis L2 and, at the same time, stands at an angle. At this time, the second housing 30 also stands.

As shown in FIGS. 7 and 8, if the second housing 30 slides and rotates, the link member 53 also rotates and makes the second housing 30 stand at a desired angle. At this time, the large LCD 31 of the second housing 30 also stands.

In this state, the user can watch TV and moving pictures using the large LCD 31.

At this time, the keypad 22 composed of the plurality of keys 22a included in the first housing 20 is opened.

The user can listen to audio through the speaker devices 23 formed at both ends of the first housing 20.

The user can also use a communication mode using the first housing 20 with the microphone device 24 and the second housing 30.

As shown in FIGS. 2 and 3, to return the second housing 30 to its original position, the second housing 30 is slid in a reverse direction. The standing link member 53 rotates with respect to the first link rotation axis L1 and the second link rotation axis L2 and is folded down, and the second housing 30 is also folded down. At this time, the guide member 41 slides within the guide hole 42 and thus returns to its original position.

In addition, as shown in FIGS. 1, 3, 5, and 7, a driving unit (not shown) that is rotatably combined with the link member 53 of the rotational moving means is included in the first housing 20 and a switch unit 70 that is electrically connected with the driving unit (not shown) is provided in the exterior of the first housing 20. The driving unit (not shown) is actuated by pressing the switch unit 70 to rotate the link member 53 of the rotational moving means and make the second housing 30 automatically stand at a desired angle.

Since the link member can rotate and stand at a desired angle by sliding the second housing, the user can easily make the portable communication apparatus stand and can easily watch TV and moving pictures using the LCD.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A portable communication apparatus comprising:
   a first housing extending in a longitudinal direction and having a mounting face with a top surface with a first longitudinal edge and a second longitudinal edge;
   a second housing that slides substantially perpendicularly to the longitudinal direction and rotates to stand at an angle with respect to the longitudinal direction, said second housing having a front side and a back side, said back side having a recess with a first surface and a second surface;
   a guide means that guides the sliding movement of the second housing; and
   a rotational moving means between the first housing and the second housing, the rotation moving means comprising a link member having a first end pivotally coupled to the first longitudinal edge of said first housing and a second end pivotally coupled to the second housing in said recess in said back side, said first surface of said recess being inclined to engage the link member and limit movement of the link member to make the second housing stand at the angle and said second surface of said recess is inclined to receive the link member when the second housing is in the first closed position; and
   a driving unit in the first housing and a switch unit for actuating the driving unit by being pressed to automatically rotate the rotational moving means between said first closed position and second open position.

2. The portable communication apparatus of claim 1, wherein the first housing includes a recessed mounting face for accommodating the second housing.

3. The portable communication apparatus of claim 2, wherein the mounting face has a curved concave surface to enable a forward edge of said second housing to slide and pivot with respect to the first housing.

4. The portable communication apparatus of claim 1, wherein the first housing comprises a keypad composed of a plurality of keys and the keypad is opened and closed by sliding the second housing.

5. The portable communication apparatus of claim 1, wherein the second housing includes a Liquid Crystal Display (LCD).

6. The portable communication apparatus of claim 1, wherein the guide means comprises:
   a pair of guide holes at both ends of the first housing, the pair of guide holes being substantially perpendicular to the longitudinal direction of the first housing;
   a pair of guide means at a first side of the second housing, the pair of guide means being slidably combined with the pair of guide holes and rotating with respect to a rotation axis during sliding.

7. The portable communication apparatus of claim 1, wherein the first housing includes a speaker device and a microphone device.

8. The portable communication apparatus of claim 1, wherein the rotational moving means includes a link member to allow the second housing to be folded or rotated at an angle with respect to a first link rotation axis at the first end of the rotation moving means and a second link rotation axis at the second end of the rotation moving means during sliding of the second housing.

9. The portable communication apparatus of claim 8, wherein a first end of the link member provides the first link rotation axis and is rotatably combined with a pair of link arms formed in the first housing and a second end of the link member provides the second link rotation axis and is rotatably combined with the back side of the second housing.

10. A portable communication apparatus comprising:
    a first housing that extends in a longitudinal direction, the first housing having a pair of guide holes located at both ends of the first housing, the pair of guide holes being substantially perpendicular to the longitudinal direction of the first housing, and a recessed mounting face having a curved concave top surface and having a keypad composed of a plurality of keys;
    a second housing having a pair of guide members, the pair of guide members being disposed in the pair of guide holes so that the second housing can slide substantially perpendicularly to the first housing, and the pair of guide members defining an axis so that the second housing can rotate about the pair of guide members to stand at an angle with respect to the first housing, where the recessed mounting face of the first housing has a dimension to accommodate the second housing, and where the keypad of said concave top surface is opened and closed by sliding said second housing, said second housing having a top side and a back side, said back side having a recess with a first inclined surface and second inclined surface with respect to a plane of said back side; and
    a rotational moving means comprising a link member disposed between the first housing and the second housing for making the second housing stand at a desired inclined angle with respect to the first housing, the rotational moving means having a first end pivotally connected to a first edge of said concave top surface of the first housing and second end received in said recess and pivotally connected to the second housing, said rotational moving means being received by said second inclined surface in said recess when said second housing is in a closed position and said rotational moving means contacts said first inclined surface to limit rotation of the rotational moving means with respect to the second housing and to support said second housing at an inclined angle.

11. The portable communication apparatus of claim 10, wherein the second housing includes a Liquid Crystal Display (LCD).

12. The portable communication apparatus of claim 10, wherein the rotational moving means comprises a link member to allow the second housing to be folded or rotated at an angle with respect to a first link rotation axis and a second link rotation axis during sliding of the second housing.

13. The portable communication apparatus of claim 12, wherein a first end of the link member provides the first link rotation axis and is rotatably combined with a pair of link arms formed on the edge of said top surface of the first housing and a second end of the link member provides the second link rotation axis and is rotatably combined with the back side of the second housing.

14. The portable communication apparatus of claim 1, wherein
said first housing has a mounting face with a top surface with a first longitudinal edge and a second longitudinal edge;
said rotational moving means comprising a link member having a first end pivotally connected to said first longitudinal edge of said mounting face, and a second end pivotally coupled to said recess in said bottom surface of said second housing, said second surface is a first inclined surface to receive said link member when the second housing is in the first closed position and said first surface is a second inclined surface to engage the link member to limit movement of the link member and support the second housing at an inclined angle.

* * * * *